United States Patent
Paduano

(10) Patent No.: US 7,083,356 B2
(45) Date of Patent: Aug. 1, 2006

(54) BALL JOINT WITH ANGULAR MOVEMENT RESTRICTION SYSTEM

(75) Inventor: Enzo Paduano, Sao Bernardo Do Campo (BR)

(73) Assignee: Dana Industrial S/A, Sao Paulo (BR)

( * ) Notice: Subject to any disclaimer, the term of this patent is extended or adjusted under 35 U.S.C. 154(b) by 787 days.

(21) Appl. No.: 10/012,518

(22) Filed: Dec. 12, 2001

(65) Prior Publication Data

US 2002/0071716 A1    Jun. 13, 2002

(30) Foreign Application Priority Data

Dec. 12, 2000  (BR)  .................................... 0006443

(51) Int. Cl.
*F16C 11/06*    (2006.01)
(52) U.S. Cl. .................. 403/144; 403/122; 403/138
(58) Field of Classification Search ......... 403/122–144
See application file for complete search history.

(56) References Cited

U.S. PATENT DOCUMENTS

| | | | | |
|---|---|---|---|---|
| 973,635 A | * | 10/1910 | Dillingham ................. | 403/140 |
| 2,674,169 A | * | 8/1954 | Sawyer ....................... | 280/477 |
| 2,819,918 A | * | 1/1958 | Seaquist ..................... | 403/134 |
| 3,527,316 A | * | 9/1970 | Jones, Jr. et al. ........... | 180/437 |
| 4,613,251 A | * | 9/1986 | Bellamy et al. ............ | 403/135 |
| 5,236,289 A | * | 8/1993 | Salyer ........................ | 408/127 |
| 5,409,332 A | * | 4/1995 | Chabot, Jr. et al. ......... | 403/114 |
| 5,443,323 A | * | 8/1995 | Prelat et al. ................ | 403/289 |
| 5,464,296 A | * | 11/1995 | Broszat ..................... | 403/138 |
| 5,746,548 A | * | 5/1998 | Crandall .................... | 403/316 |
| 6,099,192 A | * | 8/2000 | Free ........................... | 403/114 |
| 6,247,868 B1 | * | 6/2001 | Burton ....................... | 403/135 |
| 6,413,003 B1 | * | 7/2002 | Schmidit et al. ........... | 403/120 |
| 2002/0076268 A1 | * | 6/2002 | Paduano | |

FOREIGN PATENT DOCUMENTS

| | | | | |
|---|---|---|---|---|
| FR | 2 570 774 | * | 3/1986 | ................. 403/132 |
| JP | 358191317 A | * | 11/1983 | ................. 403/122 |

* cited by examiner

Primary Examiner—Robert J. Sandy
Assistant Examiner—Ruth C. Rodriguez
(74) Attorney, Agent, or Firm—Berenato, White & Stavish LLC

(57) ABSTRACT

A ball joint restriction system provides a cylindrical extension in the end of the ball, and also provides an oblong housing in the closing cover of the ball joint to restrict movement of the extension. A positioning member positions the cover with respect to the box so that the oblong opening of the housing is provided in the same direction that the oblong opening in the other end of the ball joint box, through which pin or stem of the ball type pin passes. The ball joint will guarantee the maintenance of the connecting rod, whatever is its curve and weight, perfectly aligned with the other components of the system, as well as it will allow that the ball type pin to be always positioned in its designed geometrical axle.

3 Claims, 3 Drawing Sheets

BALL JOINT WITH ANGULAR MOVEMENT RESTRICTION SYSTEM

BACKGROUND OF THE INVENTION

1. Field of the Invention

This invention refers to a ball joint with angular movement restriction system, for application in connections which require angular and rotational movement of two pieces, but whose angular movement needs to be restricted in a certain direction in order to achieve the desired effect, and more particularly, this invention is related to a ball joint to be applied in automotive vehicles.

2. Description of Related Art

Conventional construction of ball joints is based on a construction composed of a box or receptacle where there is housed a bearing, of single or split type, that houses a ball that is disposed as an integral part of the extremity of a pin, a so-called ball type (or ball) pin.

This set, duly mounted, has a fixing system in the external part of the box or receptacle, disposed at the extremity opposed to the ball, of the so-called ball type pin, in such a way that, when mounted in the box, it provides angular and rotating movements. These are the usual constructions of ball joints, generically utilized in the steering and suspension systems of vehicles. Depending on the specific located where they are to be applied, these ball joints have special characteristics design to enhance the operating requirements demanded by the pieces that must unite and articulate.

In order to overcome certain deficiencies associate with movement restriction, the state of the art utilizes the oblong opening of the joint box, common in this type of construction where it is projected to the body of the ball type pin, in such a way that the narrowest side of the opening; namely, the side that allows smaller angularity in the movement of the ball type pin, becomes coincident with the pin to restrict the movement of the ball type pin. This arrangement prevents the bar from spinning around its longitudinal axle. This technique however does not solve the problem because the body of the ball type pin of the joint is displaced itself until its maximum limit of angularity to that side and it abuts the oblong opening of the joint box. Thus, even if it partially solves the problem of rotation of the bar, it causes another problem, that is the inadequate operation of the ball joint with its ball type pin abutting against the opening of the box, outside of its geometrical axle, as it was designed. This inadequate operation of the ball joint will cause deficiency of movement, premature wearing out, noises and other undesirable inconveniences.

In an effort to solve the inconveniences of inadequate operation of the ball joint, some systems were developed that consist in replacing the cover of protection of the ball joint by a kind of rubber bushing that, when mounting the ball joint on the connecting bar, the bushing is compressed, producing a spring like effect. In cooperation with the narrowest part of the oblong opening of the joint box, the bushing attempts to prevent the rotation while at the same time holding, when the strain is not great, the ball type pin of the joint in the geometrical axle in which it was designed.

However, until now, also this technique has not presented the effects which are desirable, as when substituting the protection cover by the rubber bushing, this latter needs to be constructed in a way as to provide to the ball joint the same sealing effect as provided by the protection cover and, in order to achieve this objective it requires additional machining processes in the ball joint box and a special construction system for the rubber bushing, in order to make possible that it performs the two functions, namely, sealing the opening of the ball joint and that of providing a spring like effect so that the ball type pin of the joint is maintained in its designed geometrical axle. This system not only makes the end product expensive, but has a low index of applicability, since its use is limited to bars with short movement. Consequently, this system does not produce a great strain on the ball type pin and, further, in function of the constant strain upon the rubber bushing, this bushing tends to deteriorate before the working life time of the ball joint. Such results will affect the sealing system and consequently, with this wearing effect, the ball joint will be contaminated by impurities such as dust, sand and water, causing its premature wearing out.

SUMMARY OF THE INVENTION

In accordance with this invention, the ball joint with angular movement restriction system allows the free rotational movement of the ball type pin but, at the same time, restricts the angular movement of this same ball type pin in a certain predetermined direction.

The movement restriction system according to the preferred embodiment is applied in steering or connecting rods where movement of rotation relative to the longitudinal axle thereof is undesirable. The rotational movement of the bar relative to its longitudinal axle forces the ball type pin to displace itself angularly to one of the sides of the box of the ball joint, causing the inadequate operation of the ball joint, and further, of the connecting rod that is designed to operate in alignment with the other components of the system.

To overcome all of the deficiencies of the prior art, a ball joint system was developed to provide restriction of angular movement, while making it possible to use the product in any system subject to an excessively strong strain on the angular movement of the ball type pin in a certain direction.

Its applicability, therefore, is appropriate for any connection and steering bars, even those subject to extensive movements.

With this invention the connecting rod will be aligned with the other components of the system and the ball type pin will always be positioned in its designed geometrical axle.

BRIEF DESCRIPTION OF THE DRAWINGS

This invention is herein detailed, being shown the description of a preferred embodiment that is shown in the attached drawings, in which.

DETAILED DESCRIPTION OF PREFERRED EMBODIMENTS

Figure 1:
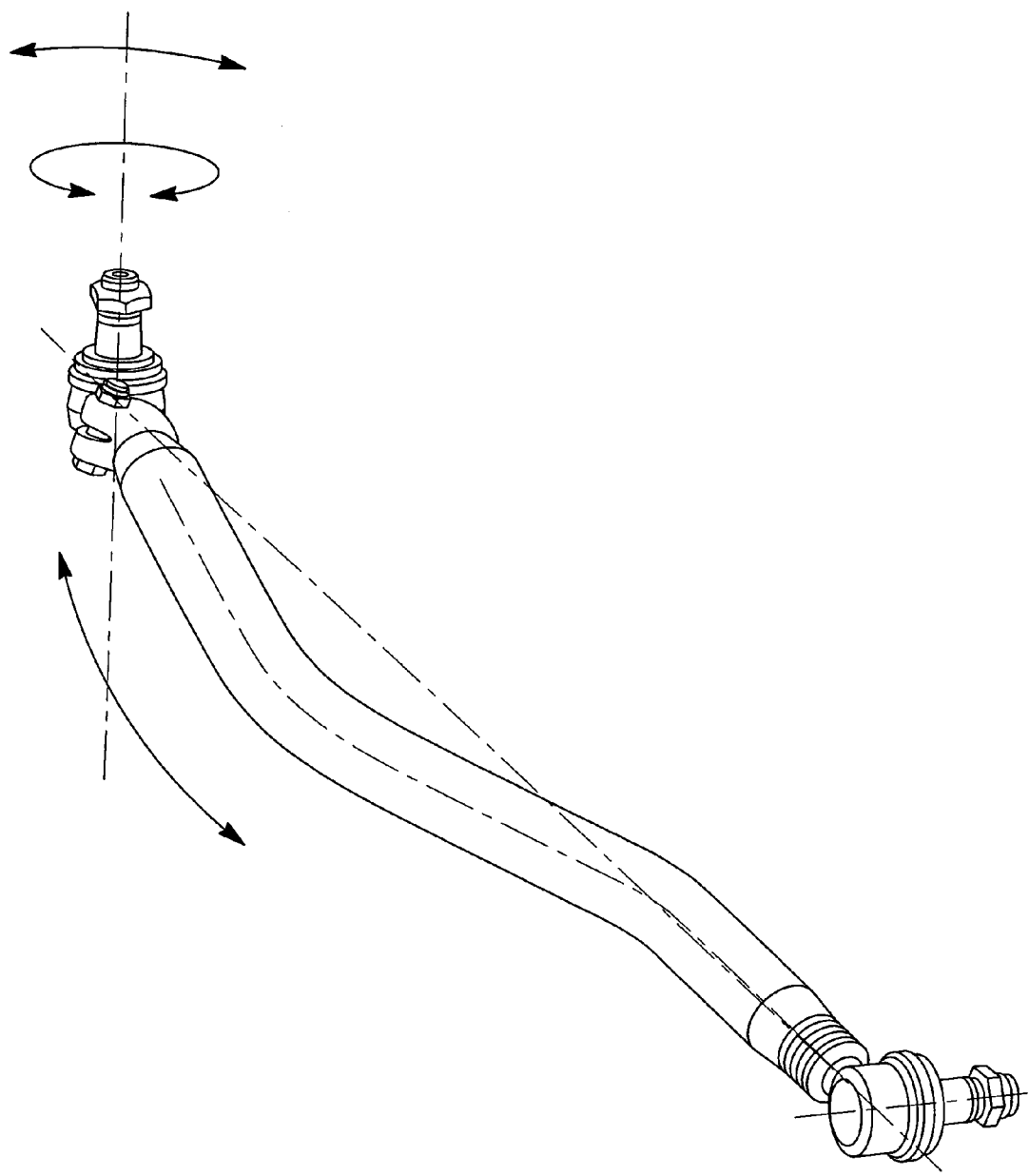
FIG. 1 shows the preferred type of steering or connecting rod to which is applied a ball joint according to this invention.
Figure 2:
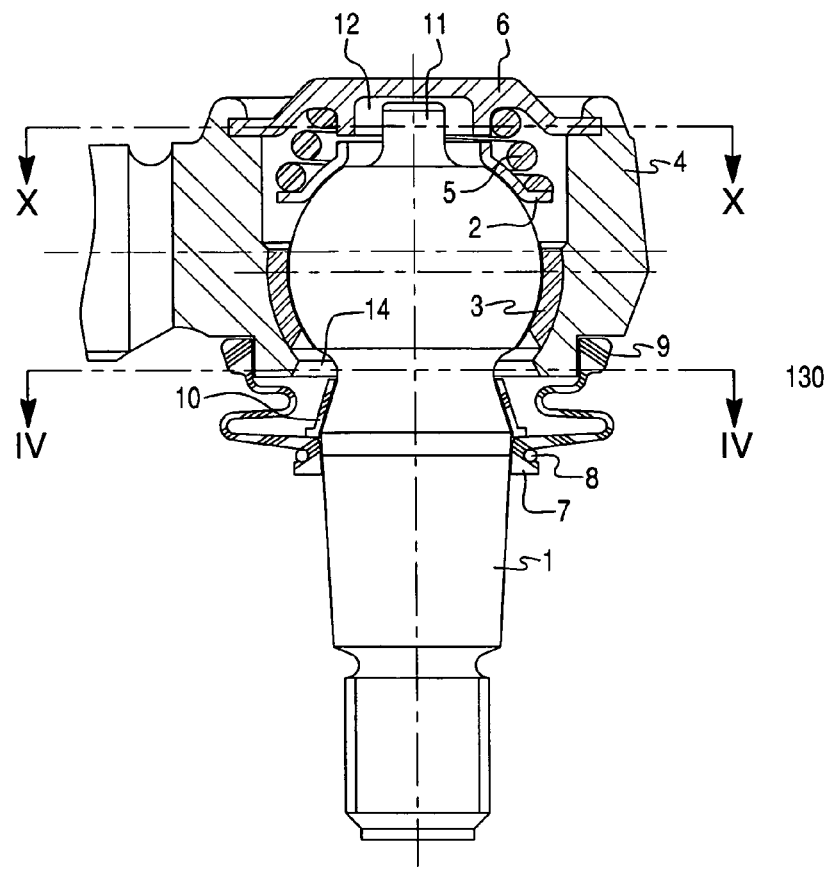
FIG. 2 shows the ball joint in a partial longitudinal cross section, for visualization of its construction details.
Figure 3:
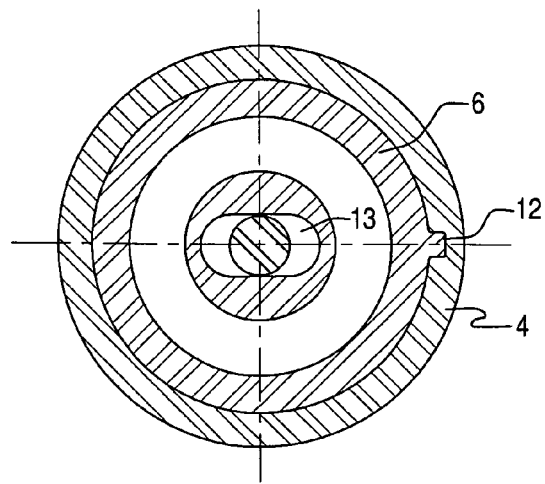
FIG. 3 shows the ball joint of FIG. 2 in plan view along the section line "x—x".
Figure 4:
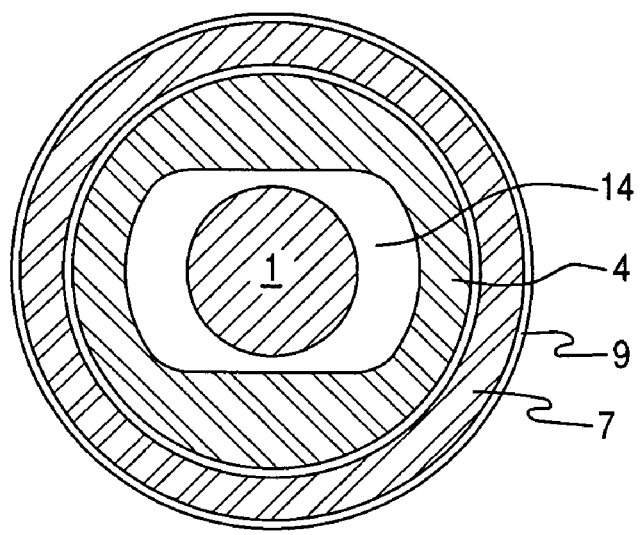
FIG. 4 which is a cross section taken along line IV—IV of FIG. 2 to show the oblong opening 14.

As it is seen in FIG. 2, the ball joint is constituted of a reinforcement pin 1 that is housed in an upper bearing member 2 and in a lower bearing member 3, and the assembly is mounted inside a box 4. Disposed inside the box 4 between the upper bearing member 2 and a cover is a spring 5. The spring 5 is introduced through an opening that is later closed by the cover 6. The ball type pin 1 projects through an end of the box 4 opposite the opening closed by the cover 6. The ball type pin 1 is fixed to a first member, i.e., a connecting rod shown in FIG. 1, and the external part of the box 4 is fixed to a second member, i.e., a steering component of an automotive steering system, so that the restricted angular and free rotational movements produced by the ball type pin 1 relative to the box 4 is transmitted to these first and second members thus satisfying the movement requirements demanded by the same.

On the body of the ball type pin 1 there is provided a sealing cover 7 that is fixed at one of its ends to the ball type pin body itself 1, through a ring 8 and, at the other end, fixed to an appropriate place provided at the outside part of the box 4, through another ring 9. In the cone provided in the body of the ball type pin 1, a spacer 10 is provided that has the purpose of maintaining the sealing cover 7 always with its original form of mounting, thus avoiding displacement of the same towards the box 4 of the ball joint. When such undesirable movement of the sealing cover 7 occurs, the angular movement of the ball type pin relative to the box 4, eventually damages the cover 7.

The ball type pin 1 has at its end, where is located the ball properly, a cylindrical extension 11 that is housed in an oblong housing portion 13 of the cover 6. The cover 6 further has a positioning point 12, that may be constructed in varying forms, but, that has the important purpose of positioning the cover during the process of mounting of the ball joint, with its coincident oblong section 13 of the housing 6, namely, in the same direction of the oblong opening 14 of the box 4 through which is projected the body of the ball type pin 1. An important technical effect results from this system, where the oblong section 13 of the cover 6 which encases the cylindrical end 11 of the ball type pin 1 is coincident with the oblong opening 14 of the box 4 through which the body of the ball type pin 1 passes. With this structural arrangement, the angular movement of the ball type pin 1 relative to the box 4 will have the required restriction, in the oblong section 13 and the oblong opening 14, to remain in its designed geometrical axle and maintain the connecting rod, taking into account the curve and weight of the connecting rod, perfectly aligned to the other components of the system.

The effect of the restriction of the angular movement of the ball type pin 1, relative to the box 4 of the ball joint, in the desired direction, is obtained therefore with all efficiency derived from the construction system itself, and the ball joint being able to be applied to any vehicle that demands this restrictive effect and in any part of the vehicle that has the same requirement, irrespective of the effort that must be supported.

While the foregoing invention has been shown and described with reference to a preferred embodiment, it will be understood by those of skill in the art that various changes in form and detail may be made therein without departing from the spirit and scope of the claimed invention.

The invention claimed is:

1. Ball joint with angular movement restriction system comprising:
   a ball type pin member having a ball portion that is disposed between an upper bearing and a lower bearing;
   a box at least partially enclosing the upper bearing and lower bearing, said box including an oblong opening;
   a cover member enclosing one end of said box;
   a spring disposed between said upper bearing and said cover;
   said ball type pin member having a pin portion projecting from said box through said oblong opening and an extension member extending in a direction substantially opposite said pin portion, said pin portion adapted for attachment to a connecting rod;
   wherein said cover member is formed with an oblong portion to restrict movement of said extension member to thereby restrict movement of said ball type pin member, and
   wherein an orientation of said oblong portion is aligned with an orientation of said oblong opening to restrict movement of said extension member.

2. Ball joint with angular movement restriction system according to claim 1, wherein said cover comprising a positioning extension for positioning said oblong portion with respect to said box.

3. Ball joint with angular movement restriction system according to claim 1, wherein said oblong portion formed on said cover restricts angular movement of the ball type pin relative to the box to thereby improve the durability and performance of the ball type pin by maintaining a connecting rod perfectly aligned to the other components of the system, irrespective of at least one of a curve and a weight of the connecting rod.

* * * * *